3,414,484
PROCESS FOR SEPARATING ETHYLBENZENE FROM $C_8$ AROMATIC HYDROCARBONS BY SUPER-DISTILLATION WITH VAPOR COMPRESSION-REBOILER HEAT EXCHANGE

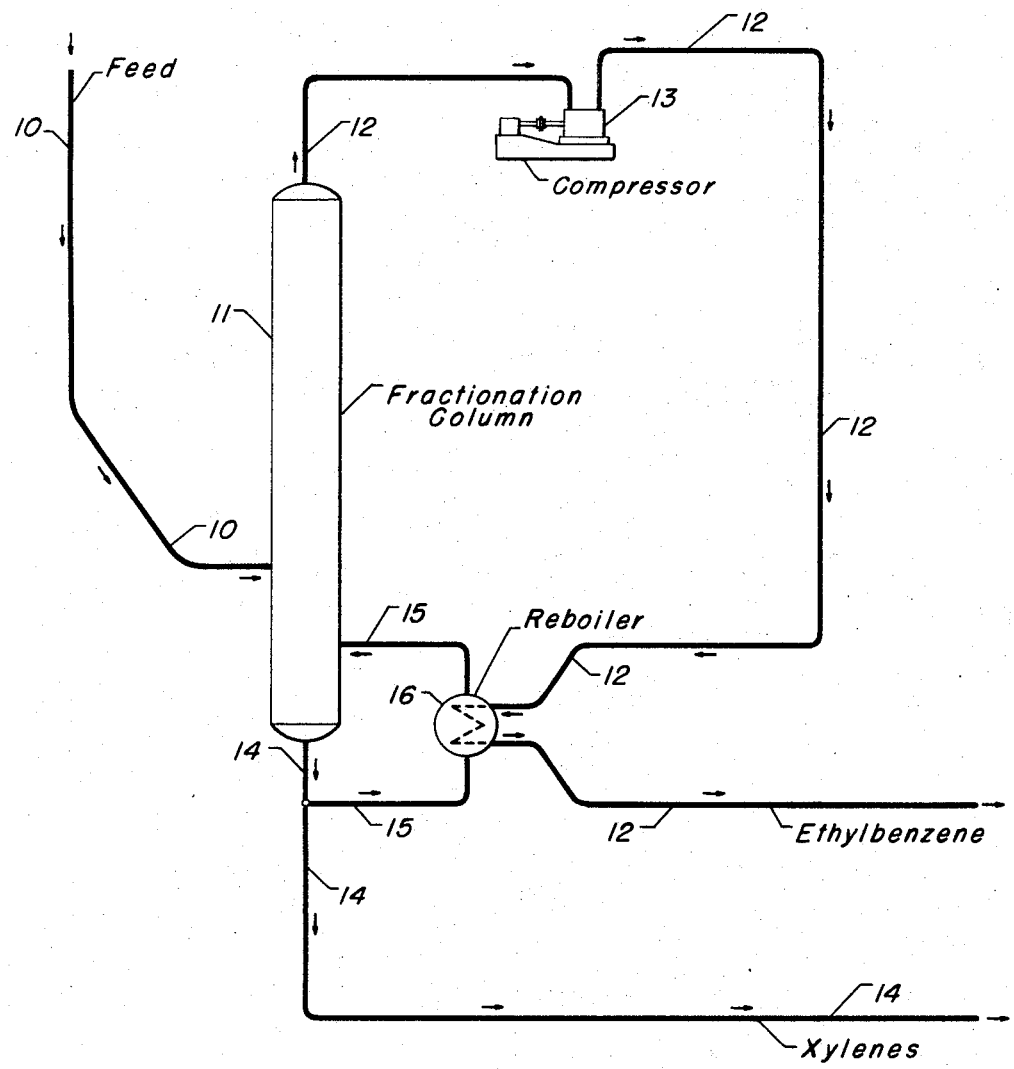

Don B. Carson, Mount Prospect, and Ted B. Haufe, Western Springs, Ill., assignors to Universal Oil Products Company, Des Plaines, Ill., a corporation of Delaware
Filed June 20, 1966, Ser. No. 558,613
8 Claims. (Cl. 203—26)

ABSTRACT OF THE DISCLOSURE

Method for separating ethylbenzene from other $C_8$ aromatic hydrocarbons via fractionation means. These means include the use of a heat pump to supply heat to the fractionator reboiler.

---

This invention relates to a process for separating close boiling alkyl aromtaic hydrocarbon mixtures. It particularly relates to a process for separating a $C_8$ alkyl aromatic hydrocarbon from a mixture containing same. It especially relates to a process for separating and recovering ethylbenzene from other $C_8$ aromatic hydrocarbons by fractionation means.

It is known in the art that ethylbenzene is present in the reaction products from the conversion of petroleum hydrocarbons such as naphtha. It is also known that such reaction products contain other aromatics such as benzene, toluene, and the xylenes. The prior art processes for recovering these $C_8$ aromatic hydrocarbons from mixtures containing the same have been numerous. The reason for increased activity in finding suitable methods for separating and recovering these aromatic hydrocarbons is the commercial desirability for using these components to make products of increased dollar value. For example, ethylbenzene, if recovered in high enough purity, can be economically dehydrogenated to produce styrene, a well-known chemical used to make various plastic articles. However, the boiling points of ethylbenzene and the crude xylenes are virtually identical; being separated in some cases by a few degrees in boiling point. Accordingly, the prior art schemes have tended to emphasize chemical adulteration of selected components of the $C_8$ aromatic hydrocarbon mixture so that the products from such adulteration will have significant differences in boiling point.

Recent advances in the art have shown that ethylbenzene can be separated from other $C_8$ aromatic hydrocarbons by the reasonably simple expedient of super-distillation. The distillation of this mixture requires, according to the prior art, at least 150 distillation stages, preferably 200 to 400 stages, and a reflux ratio (reflux volume to net overhead product volume) in the order of 60:1 to 150:1. Naturally, such a distillation system requires enormous heating and cooling loads in order to keep the system in thermal balance. Typically, an ethylbenzene-containing feed stock is charged into a series of distillation columns having a total number of distillation trays of approximately 300. Such a system will operate with a reflux ratio of approximately 80:1 with ethylbenzene being taken as an overhead vapor product, condensed and recovered in suitable recovery equipment. The liquid bottoms from the distillation train comprise primarily the crude xylenes and are reboiled to provide the heat for fractionation with a minor proportion of the bottoms being removed from the system as a net heavy aromatic product stream. Usually the reboiler on the system is steam heated with thermal balance being obtained by exchanging the feed to the system with the vapor overhead product as part of the overhead condensing and cooling means. It follows, therefore, that the overhead condensing and cooling means of the prior art process require tremendous expenditures of money not only for capital purchases, but for construction and maintenance since distillation systems having such an exorbitantly large number of distillation plates are extremely high in elevation. The operating costs on this prior art system are also significant since a source of heat must be supplied to the reboiler in order to provide vapors for stripping and rectification through a column that may be perhaps 200 to 300 feet in height.

Accordingly, it is an object of this invention to provide a process for the separation and recovery of a $C_8$ alkyl aromatic hydrocarbon from mixtures containing the same.

It is another object of this invention to provide a process for the separation and recovery of ethylbenzene from other $C_8$ aromatic hydrocarbons by distillation means.

It is still another object of this invention to provide an improved process for the recovery of ethylbenzene in high concentration in a more facile and economic manner than has heretofore been possible.

According to the present invention, a $C_8$ alkyl aromatic hydrocarbon selected from the group consisting of ethylbenzene and ortho-xylene is separated from other $C_8$ aromatic hydrocarbons by fractionation in a distillation zone using a bottoms reboiler system. The only heat source to the reboiler system is obtained by compressing at least a major proportion of the overhead vapors from the distillation zone and utilizing these compressed vapors as the heat source.

It is immediately evident from this description of the broad embodiment of the invention that the present process eliminates the expense of having a direct fired heater or a steam heated reboiler on the bottom of the fractionation column. The inventive process also eliminates the need for large and expensive overhead condensers since the reboiler serves to condense the bulk of the overhead vapors and removes multiple areas, such as flanges, pumps, etc., which are sources for air leakage into the system which would be detrimental ultimately to the quality of the styrene produced. It is also noted that the inventive concept of this process is to adapt to this unique environment the function of raising the latent temperature level of the overhead vapors sufficiently to enable use of their latent heat to supply reboiler heat to the same column by indirect heat transfer means. It was surprising to discover that the heat pump principle could be used on a $C_8$ aromatic hydrocarbon superdistillation system which operates at relatively low pressure (e.g., atmospheric) and relatively high temperature (e.g., 350° F.).

A more specific embodiment of the invention is included in the following illustrative example which provides a process for separating and recovering ethylbenzene from a $C_8$ aromatic feed stock comprising a mixture of ethylbenzene and crude xylenes which comprises passing the mixture into a distilaltion zone at a temperature of from 250° F. to 400° F. and at substantially atmospheric pressure. A bottoms product comprising primarily crude xylene is removed from the distillation zone at a temperature of from 300° F to 400° F. At least a portion of this bottoms product is reboiled at the bottom of the column to supply the heat for fractionation in the distillation zone. The heat for reboiling is supplied by indirect heat exchange between this portion of the bottoms product solely with a hereinbelow specified compressed vapor stream. An overhead vapor product comprising primarily ethylbenzene is removed from the distillation zone at a temperature of from 270° F. to 400° F. At least a portion of this overhead stream is directly compressed without intermediate cooling or processing from a pressure of substantially atmospheric to a pressure of from 20 p.s.i.g. to 50 p.s.i.g. using one stage of compression and a compression ratio of from 2:1 to 4:1, preferably about 3:1. The purpose of compressing the vapor is to significantly increase the latent temperature level of the vapor stream. Accordingly, the compressed vapors are then passed in indirect heat exchange with the bottoms product as hereinabove specified under conditions sufficient to transfer enough of the latent heat content of the vapor stream to the bottoms product being reboiled in order to supply the heat for fractionation as specified. Generally, under these conditions the compressed or relatively high pressure vapor is condensed. Thus, the sensible and latent heat is transferred from the low pressure section to the high pressure discharge and the cycle is repeated. Finally, ethylbenzene is recovered from the distillation zone in high concentration.

The ethylbenzene contents of the crude xylene mixtures which may be processed according to this invention may vary from 8% to 25% by volume. Other compositions outside of this specified range may be used, but such operations will not be as economically attractive as the one specified. For example, when a naphthenic hydrocarbon fraction is catalytically reformed in the presence of hydrogen under usual operating conditions, a xylene-rich fraction boiling between 275° F. and 300° F. may be obtained having a total $C_8$ aromatic content of about 60%, of which 8% to 10% is ethylbenzene. Further, catalytic conversion of this stream can increase the total aromatic content to about 90% with the ethylbenzene content being increased to the 16% to 20% range. It would be within the scope of this invention to prefractionate a $C_8$ aromatic stock in order to obtain a feed composition within the preferred ranges.

The design of the compression equipment necessary for the practice of this invention is well-known to those skilled in the art. The heat pump or thermo-compressor can be electrically driven and is the preferred manner of operating. Centrifugal, axial flow, and jet compression are well suited for this service. Suitable materials of construction should be used for the compressing apparatus to handle the relatively high temperatures involved. Particular attention should be paid to the use of high temperature lubricants for the bearings and seals in the apparatus.

Additionally, the distillation trays used in the various columns necessary in the practice of this invention should be of the low pressure drop type. Typically, the tray pressure drop should be below 1½ inches of water since the power requirement of the compressing apparatus is directly related to the pressure drop through the column. It is apparent that a distillation column containing, perhaps, 300 distillation trays will have appreciable pressure drop if care is not taken in the design of the trays.

The compressing of the overhead vapors is accomplished preferably with one stage of compression and with a compression ratio of from 2:1 to 3:1.

Even though the practice of this invention has been described specifically for the separation of ethylbenzene from mixed xylenes, it is apparent that other separations can also be made. For example, para-xylene may also be separated from the other isomeric xylenes i.e. meta- and ortho-xylene by the practice of this invention.

The invention may be more fully understood with reference to the attached drawing which is a schematic representation of apparatus for practicing the preferred embodiment of the invention.

DESCRIPTION OF THE DRAWING

Referring now to the drawing, a feed-stock comprising a mixture of ethylbenzene and crude xylenes is introduced into the system via line 10 and is passed into super-fractionation column 11 maintained under distillation conditions. A vapor stream comprising ethylbenzene is removed from column 11 via line 12 and passed directly into compressor means 13 for increasing significantly the pressure of the material in line 12.

A bottoms fraction comprising crude xylene substantially free of ethylbenzene is withdrawn from column 11 via line 14. According to the preferred embodiment of this invention, a portion of the bottoms material in line 14 is passed via line 15 through reboiler 16 wherein sufficient heat for distillation is added to the material in line 15. After significantly increasing its temperature by passage through reboiler 16, the heated bottoms material is re-introduced into column 11 for the release of heat for fractionation purposes therein.

Referring again to compressor 13, the compressed vapors in line 12 are passed into reboiler 16, previously mentioned, in indirect heat exchange in order to supply the heat for fractionation to the bottoms material flowing through line 15. The condensed ethylbenzene which has given up its heat in reboiler 16 is withdrawin from the system via line 12 as a substantially pure product stream.

What is claimed is:

1. In a process for separating a $C_8$ alkylaromatic hydroarbon selected from the group consisting of ethylbenzene and para-xylene from other $C_8$ aromatic hydrocarbons by fractionation in a super-distillation zone said zone containing in excess of 150 distillation stages operating at a relatively low pressure and using a bottoms reboiler system, the improvement which comprises compressing at least a major proportion of the overhead vapors from the distillation zone and utilizing said compressed vapors as the only heat source for said reboiler system.

2. Improvement according to claim 1 wherein: said distillation zone is operated at substantially atmospheric pressure; said overhead vapors are at a temperature from 270° F. to 400° F.; and said alkylaromatic hydrocarbon is ethylbenzene.

3. Improvement according to claim 1 wherein said compressing of the overhead vapors is accomplished with one stage of compression.

4. Improvement according to claim 2 wherein said compressing of the overhead vapors is accomplished with one stage of compression.

5. In a process for separating ethylbenzene from other $C_8$ aromatic hydrocarbons in a distillation zone, said zone containing in excess of about 150 distillation stages and operating at a relatively low pressure wherein heated feed stock containing ethylbenzene is introduced into said zone and the heat source for fractionation is supplied via a zone bottoms reboiler system, the improvement which comprises compressing the total overhead vapors from the distillation zone in a heat pump compressor and utilizing said compressed vapors as the sole indirect heat source for said reboiler system.

6. Improvement according to claim 5 wherein said distillation tower is operated at substantially atmospheric pressure and said overhead vapors prior to compression are at a temperature from 270° F. to 400° F.

7. Improvement according to claim 6 wherein said heat pump compressor operates with one stage of compression and a compression ratio of from 2:1 to 4:1.

8. Process for separating and recovering ethylbenzene from a $C_8$ aromatic feed stock comprising a mixture of ethylbenzene and crude xylenes which comprises passing said mixture into a distillation zone at a temperature of from 250° F. to 400° F. and substantially atmospheric pressure, said distillation zone containing in excess of 150 distillation stages, removing from said zone a bottoms product comprising primarily crude xylenes at a temperature of from 300° F. to 400° F., reboiling at least a portion of said bottoms product to supply the heat for fractionation in the zone via indirect heat exchange solely with hereinbelow specified compressed vapor stream, removing from said zone an overhead vapor product comprising primarily ethylbenzene at a temperature of from 270° F. to 400° F., directly compressing at least a portion of said overhead vapor stream from a pressure of substantially atmospheric to a pressure from 20 to 50 p.s.i.g. using one stage of compression and a compression ratio of from 2:1 to 4:1 in order to increase the sensible heat level of said vapor stream, passing the compressed vapor stream into indirect heat exchange with said bottoms product as hereinabove specified under conditions sufficient to transfer enough of the increased sensible heat content of the vapor stream to the bottoms product being reboiled to supply the heat for fractionation as specified, and recovering from said zone ethylbenzene in high concentration.

References Cited

UNITED STATES PATENTS

| | | | |
|---|---|---|---|
| 2,509,136 | 5/1950 | Cornell | 204—26 |
| 2,912,365 | 11/1959 | Irvine | 203—26 |
| 2,959,626 | 11/1960 | Krausse et al. | 203—85 |
| 3,230,155 | 1/1966 | Schurch | 203—26 |
| 3,254,024 | 5/1966 | Huckins et al. | 260—674 |
| 3,265,590 | 8/1966 | Redcay | 203—21 |

FOREIGN PATENTS

| | | |
|---|---|---|
| 308,736 | 5/1930 | Great Britain. |
| 600,574 | 4/1948 | Great Britain. |
| 667,832 | 7/1963 | Canada. |

WILBUR L. BASCOMB, JR., *Primary Examiner.*